(12) United States Patent
Sasamoto et al.

(10) Patent No.: US 11,847,791 B2
(45) Date of Patent: Dec. 19, 2023

(54) OBJECT POSITION DETECTION DEVICE, TRAVEL CONTROL SYSTEM, AND TRAVEL CONTROL METHOD

(71) Applicant: Hitachi Astemo, Ltd., Hitachinaka (JP)

(72) Inventors: Manabu Sasamoto, Tokyo (JP); Shigeru Matsuo, Tokyo (JP); Kentarou Ueno, Hitachinaka (JP)

(73) Assignee: Hitachi Astemo, Ltd., Ibaraki (JP)

( * ) Notice: Subject to any disclaimer, the term of this patent is extended or adjusted under 35 U.S.C. 154(b) by 152 days.

(21) Appl. No.: 17/440,580

(22) PCT Filed: Mar. 31, 2020

(86) PCT No.: PCT/JP2020/014748
§ 371 (c)(1),
(2) Date: Sep. 17, 2021

(87) PCT Pub. No.: WO2020/213386
PCT Pub. Date: Oct. 22, 2020

(65) Prior Publication Data
US 2022/0189179 A1    Jun. 16, 2022

(30) Foreign Application Priority Data

Apr. 17, 2019    (JP) .................................. 2019-078410

(51) Int. Cl.
*G06T 7/593* (2017.01)
*G06T 7/292* (2017.01)
(Continued)

(52) U.S. Cl.
CPC ............. *G06T 7/593* (2017.01); *B60W 30/16* (2013.01); *G06T 7/292* (2017.01); *G06V 10/25* (2022.01);
(Continued)

(58) Field of Classification Search
CPC . G06T 2207/20021; G06T 2207/10028; G06T 2207/30236; G06T 7/292
See application file for complete search history.

(56) References Cited

FOREIGN PATENT DOCUMENTS

| EP | 3 690 812 A1 | 8/2020 |
|----|--------------|--------|
| JP | 2002-122670 A | 4/2002 |

(Continued)

OTHER PUBLICATIONS

International Preliminary Report on Patentability dated Oct. 28, 2021 for PCT Patent Application No. PCT/JP2020/014748.
(Continued)

*Primary Examiner* — Myron Wyche
(74) *Attorney, Agent, or Firm* — Volpe Koenig

(57) ABSTRACT

An object position detection device includes a first distance detection unit detecting a distance of an object from images, a first position detection unit detecting a position of the object based on the distance, a processing area which contains the object detected by the first distance detection unit in images, a second position detection unit that detects a position of the object in the processing area, a second distance detection unit that detects a distance of the object based on the position of the object detected by the second position detection unit, a unit that detects an orientation of the object based on the position of the object detected by the second position detection unit, and a determination unit that determines the distance and the position of the object in accordance with information of detections executed by the first and the second distance detection units, and the orientation detection unit.

7 Claims, 9 Drawing Sheets

(51) Int. Cl.
    *G06V 20/58*     (2022.01)
    *B60W 30/16*     (2020.01)
    *G06V 10/25*     (2022.01)

(52) U.S. Cl.
    CPC .... *G06V 20/58* (2022.01); *G06T 2207/10028* (2013.01); *G06T 2207/30236* (2013.01)

(56) References Cited

FOREIGN PATENT DOCUMENTS

| | | |
|---|---|---|
| JP | 2003-061075 A | 2/2003 |
| JP | 2004-053278 A | 2/2004 |
| JP | 2011-121398 A | 6/2011 |
| WO | 2019/058755 A1 | 3/2019 |
| WO | WO2019058755 * 3/2019 ... G06T 2207/20021 | |

OTHER PUBLICATIONS

International Search Report, PCT/JP2020/014748, dated Jun. 30, 2020 (4 pgs).

Chinese Office Action dated Jul. 18, 2023 for Chinese Patent Application No. 202080022575.7.

Li Qiang, "Research on Synchronous Positioning and Composition of Blind-guiding Robot Based on Information Fusion of Heterogeneous Sensors," China Excellent Master's Thesis Full-text Database Information Technology Technology Series, China Academic Journal Electronic Publishing House, pp. 42-43, (Mar. 15, 2019). (with English concise explanation of the relevance provided by English translation of Chinese Office Action dated Jul. 18, 2023 for Chinese Patent Application No. 202080022575.7).

* cited by examiner

OBJECT POSITION DETECTION DEVICE, TRAVEL CONTROL SYSTEM, AND TRAVEL CONTROL METHOD

TECHNICAL FIELD

The present invention relates to a device that detects a position of an object.

BACKGROUND ART

As background art of the relevant technical field, patent literature 1 proposes the approach for suppressing increase in amount of computation that involves operations of the stereo camera for tracking an object.

Specifically, the patent literature 1 discloses the operation for tracking the object by selecting the object recognition process between 3D recognition and 2D recognition in accordance with the distance derived from the 3D recognition, and size of the object on the image.

CITATION LIST

Patent Literature

Patent Literature 1: Japanese Unexamined Patent Application Publication No. 2003-61075

SUMMARY OF INVENTION

Technical Problem

The patent literature 1 discloses the operation of tracking the object by selecting the recognition process between the 3D recognition and the 2D recognition in accordance with results derived from the 3D recognition so that the arithmetic load can be reduced. In the case where the object deviates from the image pickup view angle, there may be the risk of lowering the tracking accuracy.

Having been made in light of solution of the above-described problem, it is an object of the present invention to provide an object position detection device capable of detecting the object accurately irrespective of the view angle position and the distance of the object.

Solution to Problem

In order to solve the problem, the present invention provides an object position detection device. The device includes a first distance detection unit that detects a distance of an object from images derived from a first image pickup unit and a second image pickup unit, a first position detection unit that detects a position of the object based on the distance detected by the first distance detection unit, a processing area setting unit that sets a processing area which contains the object detected by the first distance detection unit in any one of the images picked up by multiple image pickup units including the first and the second image pickup units, a second position detection unit that detects a position of the object in the processing area, a second distance detection unit that detects a distance of the object based on the position of the object detected by the second position detection unit, an orientation detection unit that detects an orientation of the object based on the position of the object detected by the second position detection unit, and a determination unit that determines the distance and the position of the object in accordance with information of detections executed by the first distance detection unit, the second distance detection unit, the first position detection unit, the second position detection unit, and the orientation detection unit, respectively.

Advantageous Effects of Invention

The present invention allows accurate detection of the object irrespective of the view angle position and the distance of the object.

Other tasks, structures, functions, and effects of the present invention will be clarified by explanations of embodiments to be described hereinafter.

DESCRIPTION OF EMBODIMENTS

Figure 1:
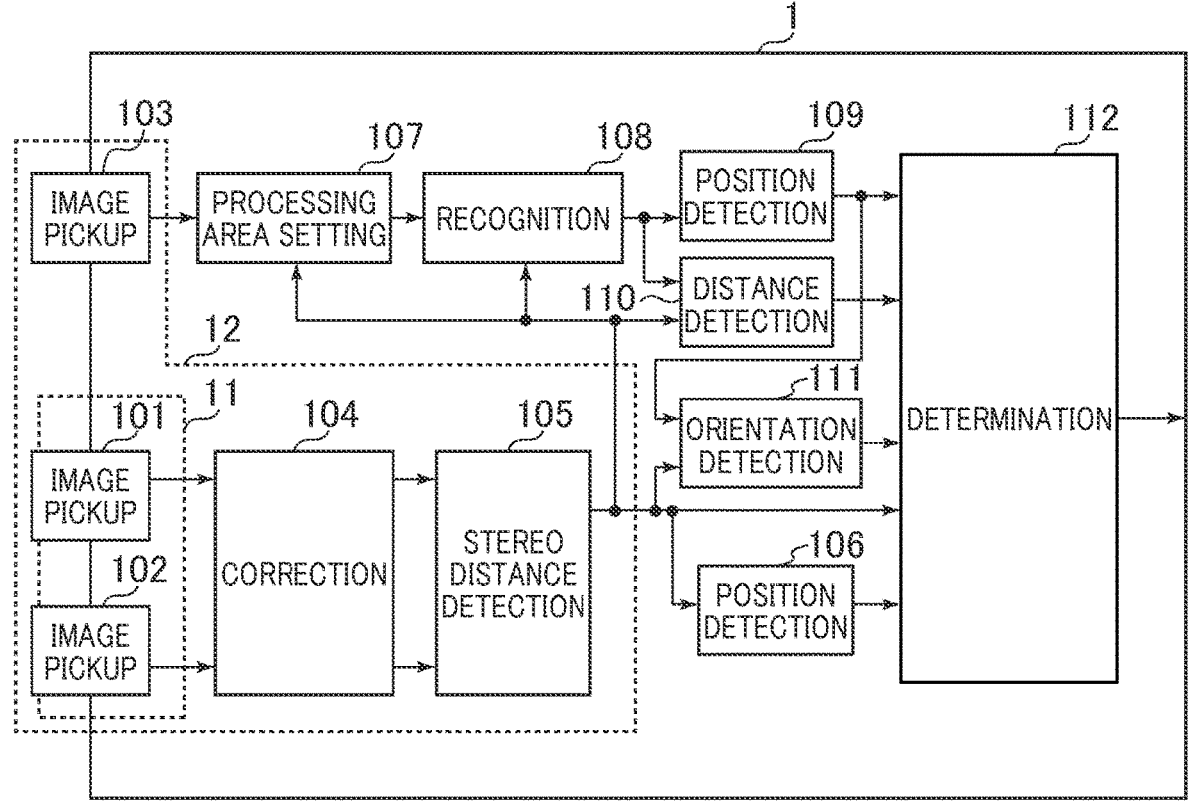
FIG. 1 shows a structure of an object position detection device according to a first embodiment of the present invention.

Embodiments of the present invention will be described referring to the drawings. In the following embodiments, a preceding vehicle is exemplified as an object subjected to the position detection so that the position of the preceding vehicle is detected. The present invention is not limited to the one as described above, but may be applied to detection of the position of an arbitrary object.

First Embodiment

FIG. 1 shows a structure of an object position detection device according to a first embodiment of the present invention. A code 1 denotes the object position detection device according to the embodiment. The object position detection device 1 is installed in the front part of the vehicle for recognizing such object as the preceding vehicle, which constitutes a part of the system that assists the control of traveling while following the preceding vehicle.

Codes 101, 102, and 103 denote image pickup units. Each of the image pickup units 101, 102 and 103 has its image sensor provided with an optical lens. Each of those image pickup units 101, 102, and 103 picks up a single image repeatedly at predetermined timing, and outputs the picked-up image. The image pickup units 101 and 102 are disposed apart from each other by a predetermined distance on left and right sides. The object position detection device 1 is capable of calculating the distance of the object based on a gap between the images picked up by the image pickup unit 101 and the image pickup unit 102, that is, parallax.

FIG. 1 shows that components of the object position detection device 1 are disposed in the same housing. It is possible to store the image pickup units 101 and 102 in another housing separately from the other components (as enclosed by a broken line 11 of FIG. 1), or to store each of the image pickup units 101, 102, and 103 in a different housing so as to be installed in the vehicle individually. In this case, image signals may be transmitted by connecting the respective structures via not shown connection cables. The transmission method using the differential transmission path of LVDS (Low Voltage Differential Signaling) type is available as the method of transmitting images using the connection cable.

The use of color image sensors as the image sensors for the image pickup units 101, 102, and 103 allows the object position detection device 1 to acquire color information of the picked-up image. This makes it possible to determine the state of the traffic signal or the taillight of the preceding vehicle based on the color information in addition to the luminance information.

A code 104 denotes an image correction unit. The image correction unit 104 captures images from the image pickup units 101 and 102, and corrects those images using a preliminarily measured correction value so that each luminance of the images matches with each other. The image correction unit further performs correction of distortion of the image owing to lens, and horizontal alignment between images of the image pickup units 101 and 102 using the preliminarily measured correction value.

The respective correction values are preliminarily measured in the manufacturing process of the object position detection device 1. Before application of the correction value to each unit of the object position detection devices 1, an image of the specific object is picked up to obtain a luminance correction value for each pixel so that luminance of the acquired image becomes uniform, and a geometric correction value for each pixel so that the image is leveled by canceling the lens distortion. The acquired values are stored for each unit of the object position detection devices 1 individually as correction tables in a not shown non-volatile memory.

A code 105 denotes a stereo distance detection unit. The stereo distance detection unit 105 detects a distance of an object and a classification of the object with reference to an image input from the image correction unit 104. An exemplary method for detecting the distance is implemented as follows. The stereo distance detection unit 105 captures the image from the image correction unit 104 to calculate the parallax. As described above, the image pickup units 101 and 102 are disposed apart from each other on left and right sides by a predetermined distance. There is the parallax between the picked-up images. The parallax is then calculated, that is, the stereo image processing is executed.

The parallax is calculated by executing the block matching process, for example. Specifically, the stereo distance detection unit 105 searches an area on the image picked up by the image pickup unit 102, which corresponds to a block area with a given small size, for example, 8×8 pixels that have been segmented from the designated area of the image picked up by the image pickup unit 101. The stereo distance detection unit 105 horizontally shifts the block area with the same size on the image of the image pickup unit 102 by the designated number of pixels as a search density. The obtained correlating value is evaluated. The stereo distance detection unit 105 sets 128 pixels as the search range and 2 pixels as the search density, or 32 pixels as the search range and 1 pixel as the search density so that the calculation load and accuracy can be controlled together with designation of the processing area. As the search density is made large, accuracy of the distance of the object to be detected becomes coarse. However, the processing load in the search range is alleviated. As the search density is made small, accuracy of the distance to be detected becomes high.

The positional difference of the block areas matched in the picked-up images between the image pickup units 101 and 102 becomes the parallax expressed by the pixel number. The stereo distance detection unit 105 is capable of obtaining the distance of the object reflected on the block area in the actual environment using the parallax. In this example, the block area is used as an image element of the object required to have the distance acquired. When implementing the coincidence comparing process for evaluating the correlating value, the parallax is defined as the position where the total sum of the luminance difference in pixels in block areas to be compared becomes small.

It is known that the distance to be detected is derived from each focal length of lens of the image pickup units 101 and 102, the base line length as the distance between the image pickup units 101 and 102, the parallax obtained as described above, and the pixel pitch of the image pickup sensor. In the present invention, the method of calculating the distance is not limited to the one described above. Individual pixel constituting the image pickup sensor may be used as the image element required to have the distance acquired besides the block area as described above.

Concerning the object detection method, if there are adjacent pieces of distance information each indicating substantially the same distance, the stereo distance detection unit 105 groups such information into a single set. If size of the group is equal to or larger than a given size, such group is recognized as the object. Based on the size and shape of the detected group, the stereo distance detection unit 105 detects the vehicle as the object. In another method, the size and shape of the object are detected by comparison with preliminarily stored pattern data as the reference data. This process provides the distance from the own vehicle to the preceding object, for example, the vehicle with high accuracy. The information is used for collision avoidance so that the own vehicle is decelerated or stopped. The obtained information about the type and distance of the object is output to a position detection unit 106, a processing area setting unit 107, a recognition unit 108, a distance detection unit 110, an orientation detection unit 111, and a determination unit 112, all of which will be described later.

A code 106 denotes the position detection unit. The position detection unit 106 detects the object position based on the result of the stereo distance detection unit 105. The position information includes a center of positions between the image pickup units 101 and 102, and left and right positions expressed by the difference from the lateral center of the object.

A code 107 denotes the processing area setting unit. Based on the object detection results derived from the stereo distance detection unit 105, the processing area setting unit 107 sets and segments the area that contains the object subjected to recognition, and detection of position and distance, which will be executed by the recognition unit 108, the position detection unit 109, and the distance detection unit 110, respectively at the latter stage from images picked up by the image pickup unit 103.

A code 108 denotes the recognition unit. The recognition unit 108 recognizes the object contained in the area segmented by the processing area setting unit 107. In this example, the recognition unit 108 recognizes the object by executing a single-eye processing. The recognition unit 108 detects the expected preceding vehicle from the input images. This detection method includes the one for detecting the object such as the vehicle based on similarity of the luminous distribution and the edge shape information of the image to the pattern data stored as reference data. The recognition unit 108 is capable of distinguishing the type of the preceding vehicle, for example, passenger vehicle and truck based on the retained pattern data.

Inputting of the type of the object detected by the stereo distance detection unit 105 to the recognition unit 108 eliminates the need of comparison with the pattern data for detecting the object, resulting in reduced processing load.

A code 109 denotes the position detection unit. The position detection unit 109 detects a position of the object recognized by the recognition unit 108 from the area segmented by the processing area setting unit 107. The position information includes an intermediate point between the image pickup units 101 and 102, and left and right positions expressed by the difference from the lateral center of the object. The position detection unit 109 specifies a position of a rear end surface of the object, and outputs the position to the orientation detection unit 111 to be described later. The rear end surface of the object represents a tail end surface of the vehicle, for example. When the side surface of the vehicle is contained in the acquired image upon turning of the vehicle, the orientation detection accuracy is improved by making the orientation of the tail end surface except the vehicle side surface detectable. The method of specifying the position of the rear end surface is implemented by detection from the image luminance distribution and the vertical edge shape information. The position detection unit 109 may be configured to selectively detect the object only recognized as the vehicle.

A code 110 denotes the distance detection unit. The distance detection unit 110 detects the distance of the object recognized by the recognition unit 108. The distance detection unit 110 is capable of detecting the distance in accordance with height and size of the detected object on the screen.

The distance detection unit 110 is capable of limiting the number of pattern data to be compared by inputting the distance and the size of the object previously detected by the stereo distance detection unit 105. The object distance can be detected by executing the minimum required processing.

A code 111 denotes the orientation detection unit. The orientation detection unit 111 detects the orientation of the object, for example, a horizontal angular difference $\Delta\theta$ between the preceding vehicle and the own vehicle. The angular difference changes in accordance with change in a yaw angle between the preceding vehicle and the own vehicle. The orientation detection unit 111 obtains the gradient by executing linear approximation of the horizontal distance in the relative plane of the object.

It is assumed that the relation between a coordinate X of the tail end surface of the object (preceding vehicle) in the horizontal direction (lateral direction) and a distance Z (depth) is expressed by (X, Z), and measured results expressed by (X1, Z1), (X2, Z2), . . . , and (X5, Z5) are obtained. The orientation detection unit 111 obtains a regression line ($Z = a1 \times X + a2$; a1, a1:constant) through the least-squares method, and calculates the angular difference $\Delta\theta (= \arctan(a1))$ from the gradient a1.

The orientation detection unit 111 receives an input of information that specifies the tailing end surface of the preceding vehicle from the position detection unit 109, and detects the orientation specific to the tail end surface by removing the vehicle side surface so that orientation detection accuracy can be improved. The orientation detection unit 111 is capable of selectively detecting the object only recognized as the vehicle.

A code 112 denotes the determination unit. The determination unit 112 receives distance detection results from the stereo distance detection unit 105, position detection results from the position detection unit 106, orientation detection results from the orientation detection unit 111, position detection results from the position detection unit 109, and distance detection results from the distance detection unit 110, makes determination on the results, and outputs the object detection results to the outside of the object position detection device 1.

The image pickup units 101, 102, 103, the image correction unit 104, and the stereo distance detection unit 105 of the object position detection device 1, which are enclosed by a broken line frame 12 are constituted by electronic circuits. The other components of the object position detection device 1 are implemented by software processing using a not shown microcomputer. It is also possible to implement the stereo distance detection unit 105 by software processing.

Figure 2:
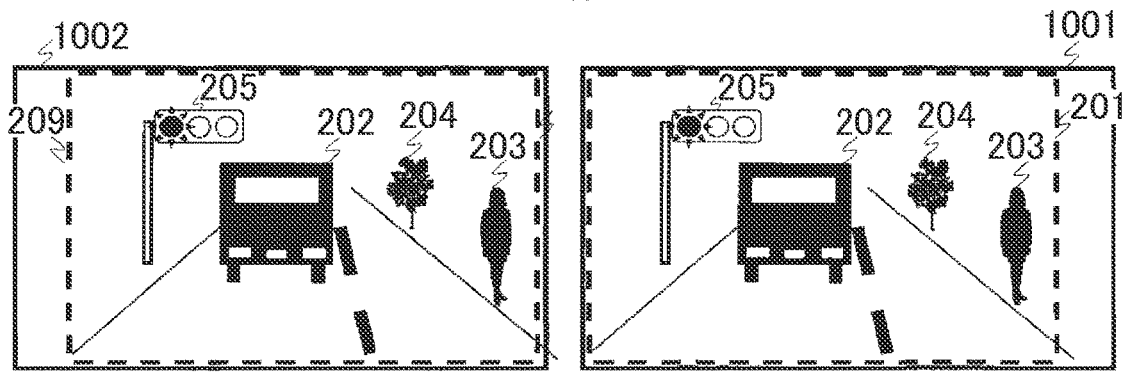
FIG. 2 shows exemplary picked-up images derived from the object position detection device according to the first embodiment of the present invention.
Figure 2:
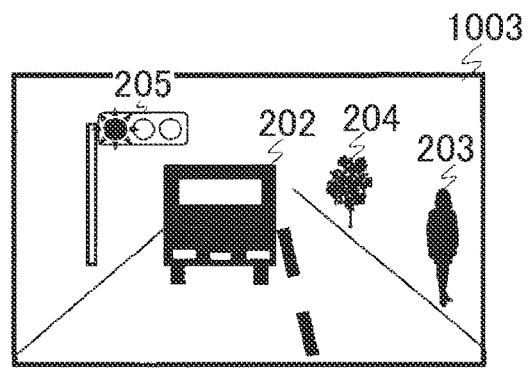

FIG. 2 shows exemplary images picked up by the object position detection device 1 according to the first embodiment of the present invention. Referring to the drawing, a code 1001 denotes a picked-up image derived from the image pickup unit 101 and corrected by the image correction unit 104. A code 1002 denotes a picked-up image derived from the image pickup unit 102 and corrected by the image correction unit 104. A code 1003 denotes a picked-up image derived from the image pickup unit 103. A code 202 denotes the preceding vehicle as the object. A code 203 denotes a pedestrian as the object. A code 204 denotes a street tree as the object. A code 205 denotes a traffic signal as the object.

Codes 201, 209 of the drawing denote commonly picked up image areas (common image pickup areas) of the picked-up images 1001 and 1002. The gap exists in the common image pickup areas between the picked-up images 1001 and 1002. The distance of the object is calculated based on an amount of the gap, that is, parallax.

The image pickup unit 103 is set to have the image pickup view angle substantially equal to each value of the image pickup units 101 and 102. The picked-up image 1003 has the area corresponding to the area 201 of the picked-up image 1001, which is enclosed by the broken line. When using the image pickup sensor for the image pickup unit 103, which is configured to have pixels more than those of the image pickup sensors for the image pickup units 101 and 102, the picked-up image 1003 derived from the image pickup unit 103 exhibits higher resolution. This makes it possible to make accuracy of detecting the object and the distance higher.

Figure 3:
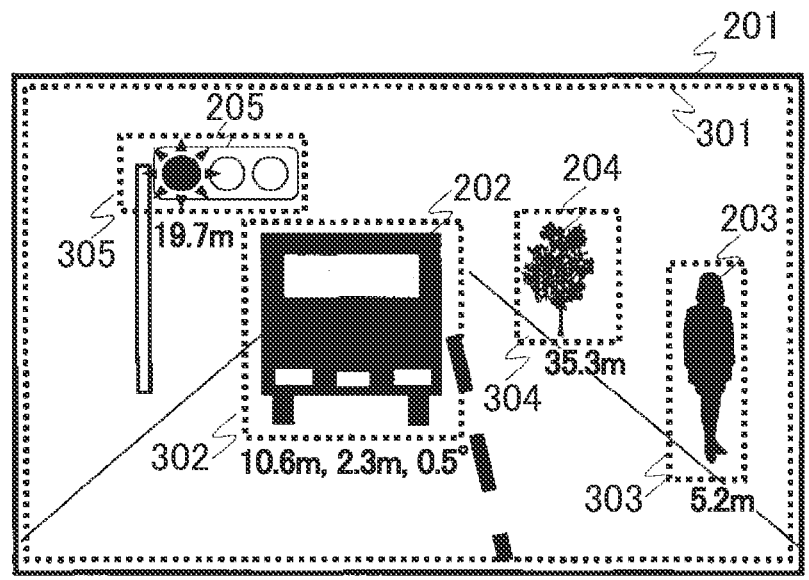
FIG. 3 shows an exemplary picked-up image derived from the object position detection device according to the first embodiment of the present invention together with detection results.

FIG. 3 shows a picked-up image derived from the object position detection device 1 according to the first embodiment of the present invention, and exemplary operations of the stereo distance detection unit 105, the position detection unit 106, and the orientation detection unit 111. In the drawing, the area 201 is the image picked-up area common to the image picked up by the image pickup unit 102, which is a part of the picked-up image derived from the image pickup unit 101 and corrected by the image correction unit 104.

A code 301 denotes a processing area where the stereo distance detection unit 105 detects the distance of the object and the type of the object. In the embodiment, the processing area 301 represents a whole space of the area 201. The stereo distance detection unit 105 acquires the parallax by executing the above-described block matching process in the range of the processing area 301, and detects the object from the parallax group.

Each of codes 302, 303, 304, and 305 denotes a processing area indicating the object detection result enclosed by the broken line. Frames and numerical values added to the images are not picked-up images, but superposed on the images for explicit indication. In the embodiment, detection results of the respective processing areas are shown. For example, detection results of the preceding vehicle 202 in the processing area 302 indicate the distance of 10.6 m, position of 2.3 m, and orientation of 0.5°. A detection result of the pedestrian 203 in the processing area 303 indicates the distance of 5.2 m. A detection result of the street tree 204 in the processing area 304 indicates the distance of 35.3 m. A detection result of the traffic signal 205 in the processing area 305 indicates the distance of 19.7 m. The object position detection device 1 ensures to detect the distance, position, and orientation of the object over the whole picked-up image.

The detected information data of distance, position, and orientation are output to the determination unit 112.

Figure 4:
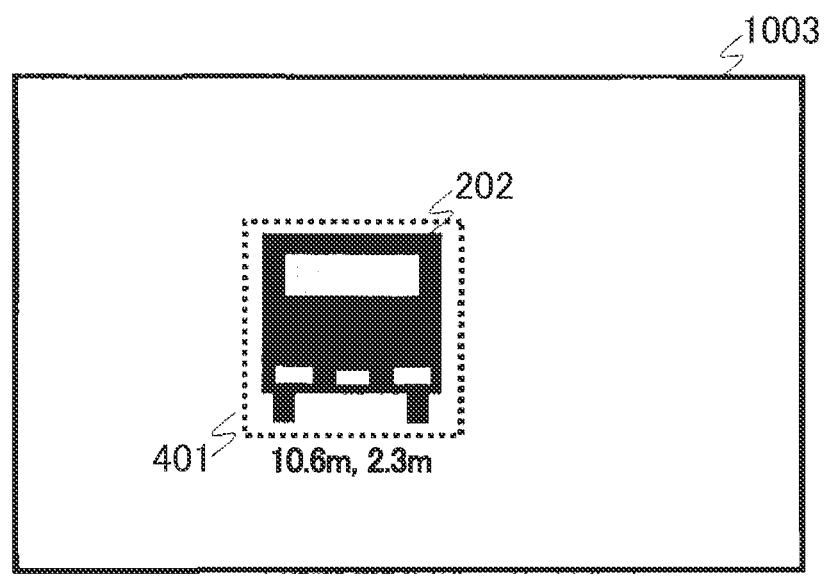
FIG. 4 shows another exemplary picked-up image derived from the object position detection device according to the first embodiment of the present invention together with detection results.

FIG. 4 shows the picked-up image 1003 derived from the image pickup unit 103, and exemplary operations of the processing area setting unit 107, the recognition unit 108, the position detection unit 109, and the distance detection unit 110. The processing area setting unit 107 selects the object information indicating the vehicle from the object information output from the stereo distance detection unit 105, segments the image corresponding to the selected information, and outputs the image to the subsequent recognition unit 108. In this example, the preceding vehicle 202 exists inside the processing area 301 as shown in FIG. 2. The processing area setting unit 107 selects the information of the preceding vehicle 202 so that the image is segmented and output. A code 401 denotes a processing area of the image, which is segmented by the processing area setting unit 107, and output to the subsequent recognition unit 108 so that the load of the subsequent processing can be reduced. The drawing shows detection results from the position detection unit 109 and the distance detection unit 110, that is, 10.6 m and 2.3 m indicating the distance and the position of the preceding vehicle 202, respectively. The position detection unit 109 and the distance detection unit 110 output the distance and the position of the object, which have been detected to the determination unit 112.

Figure 5:
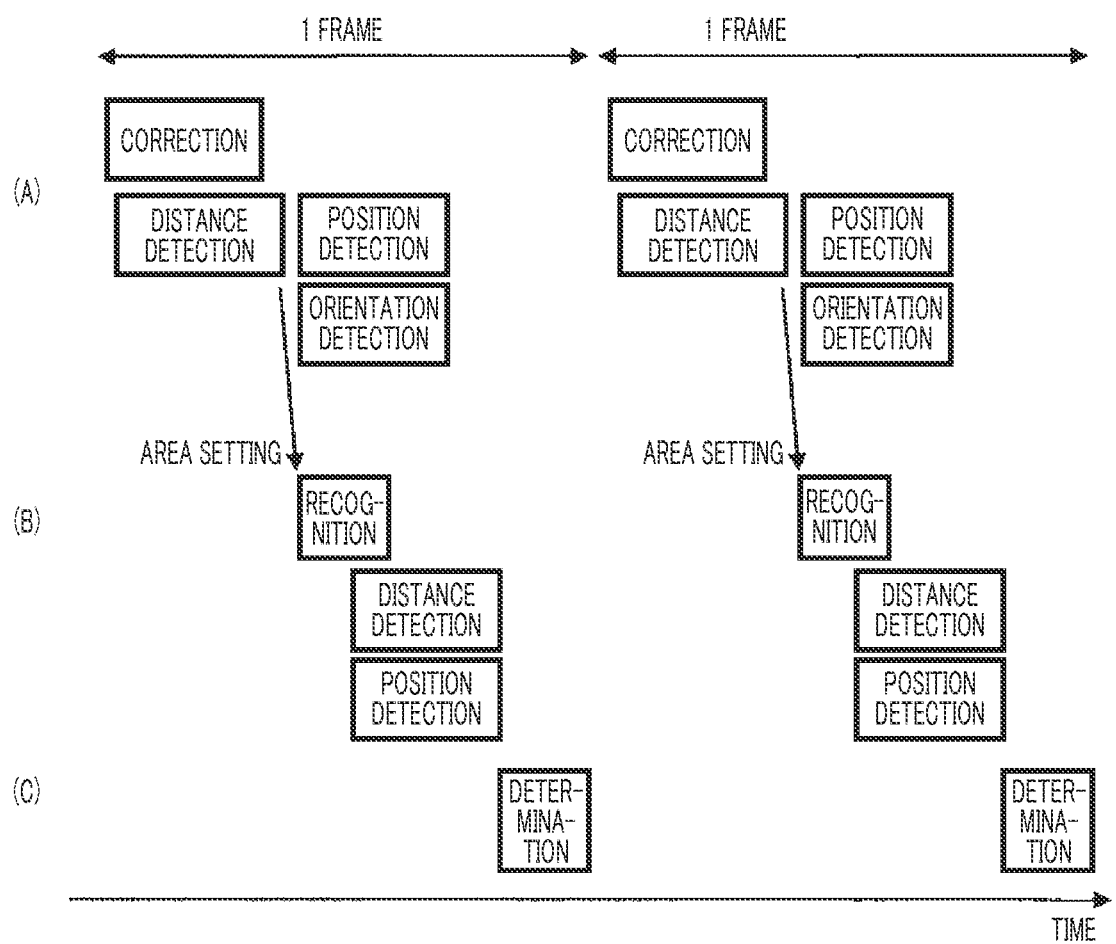
FIG. 5 represents processing timing of the object position detection device according to the first embodiment of the present invention.

FIG. 5 shows timing of the processing executed by the object position detection device 1 according to the first embodiment of the present invention. FIG. 5A shows each timing of the processing executed by the image correction unit 104, the stereo distance detection unit 105, the position detection unit 106, and the orientation detection unit 111. FIG. 5B shows each timing of the processing executed by the processing area setting unit 107, the recognition unit 108, the position detection unit 109, and the distance detection unit 110. FIG. 5C shows timing of the processing executed by the determination unit 112.

Referring to FIG. 5A, the distance detection processing is executed by the image correction unit 104 and the stereo distance detection 105 to detect the object. The position detection unit 106 detects the position of the object, and the orientation detection unit 111 detects the orientation of the object.

Referring to FIG. 5B, in response to the object information detected in the processing as shown in FIG. 5A, the recognition unit 108 recognizes the object in the processing area designated by the processing area setting unit 107. The position detection unit 109 detects the object position, and the distance detection unit 110 detects the distance.

Referring to FIG. 5C, based on detection results derived from the processing as shown in FIGS. 5A and 5B, the detection result of the object determined by the determination unit 112 is output.

Figure 6:
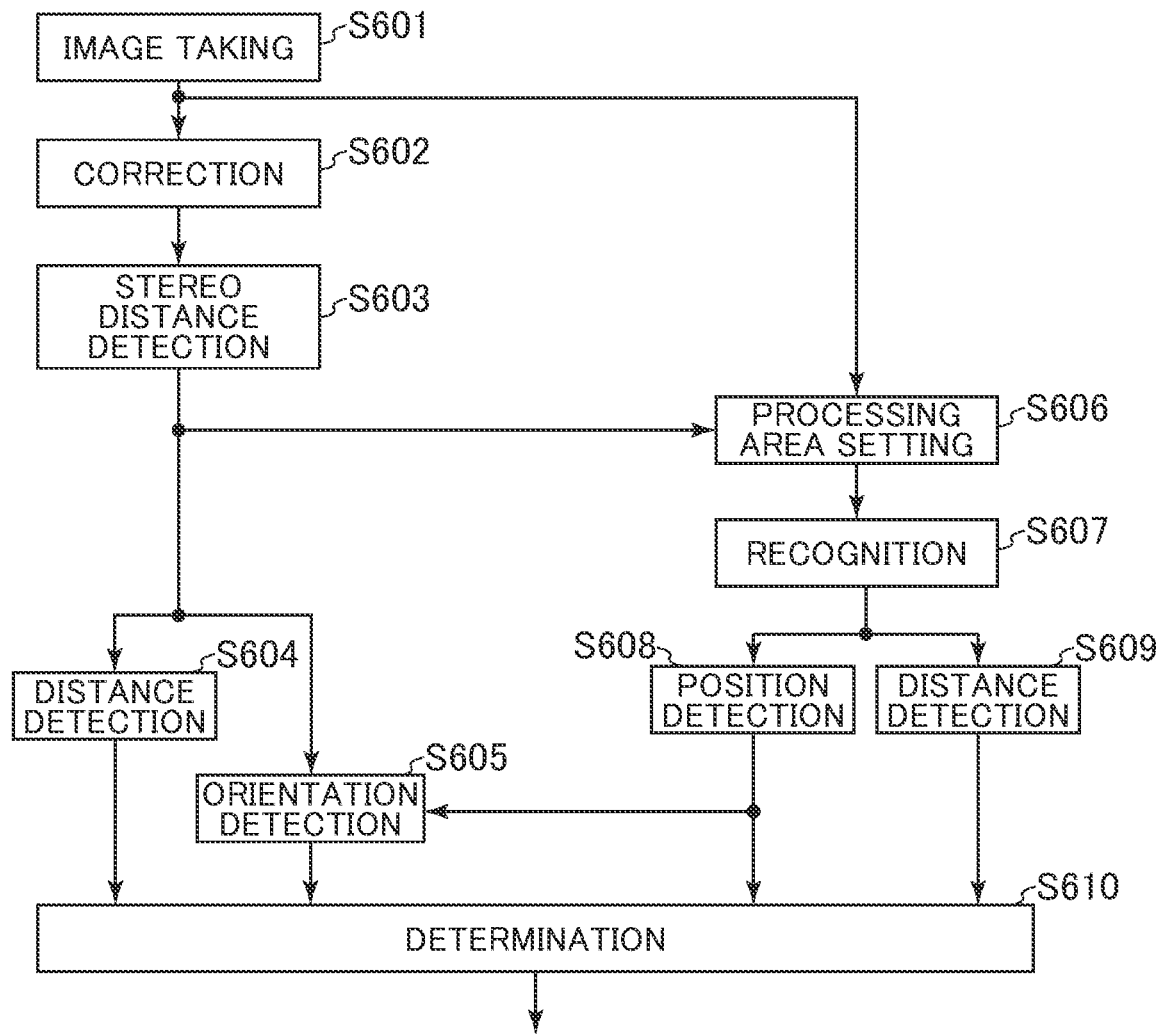
FIG. 6 is a flowchart of processing executed in the object position detection device according to the first embodiment of the present invention.

FIG. 6 is a flowchart of processing executed by the object position detection device 1 according to the first embodiment of the present invention. The image pickup devices 101, 102, and 103 pick up images (step S601). Each image picked up by the image pickup units 101 and 102 is subjected to the luminance correction, lens distortion correction, and horizontal alignment, which are performed by the image correction unit 104 (step S602). The stereo distance detection unit 105 detects the object in the processing area 301, and the distance of the object (step S603). The position detection unit 106 detects the position of the object (step S604), and the orientation detection unit 111 detects the orientation (step S605).

Based on the detection result of the stereo distance detection unit 105, the processing area setting unit 107 segments the area to be processed from the image picked up by the image pickup unit 103, and outputs the area to the recognition unit 108 (step S606) for recognizing the object in the object containing area (step S607). The position detection unit 109 detects the position of the object (step S608), and the distance detection unit 110 detects the distance of the object (step S609).

Finally, the determination unit 112 makes a determination based on detection results of the object in the respective steps, and outputs a determination result (step S610). The object position detection device 1 executes the series of processing steps repeatedly for each frame.

Figure 7A:
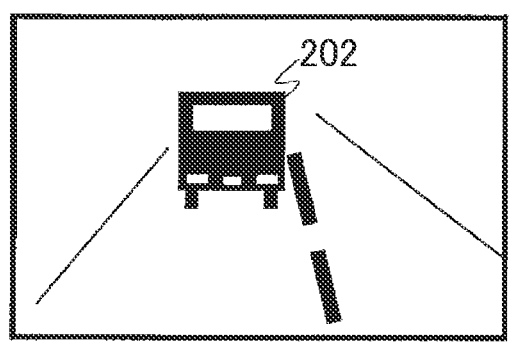
FIG. 7A shows an example of an image picked up by the object position detection device according to the first embodiment of the present invention at a time point t1 during traveling.
Figure 7B:
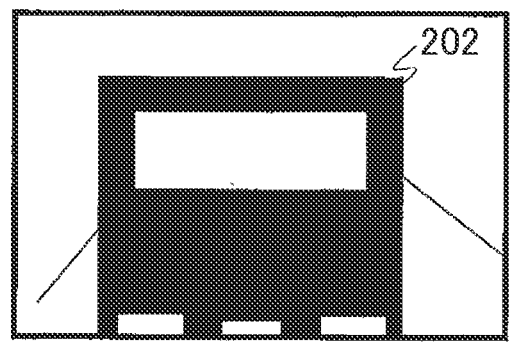
FIG. 7B shows an example of an image picked up by the object position detection device according to the first embodiment of the present invention at a time point t2 during traveling.
Figure 7C:
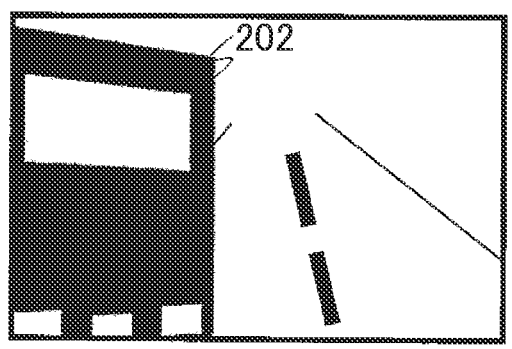
FIG. 7C shows an example of an image picked up by the object position detection device according to the first embodiment of the present invention at a time point t3 during traveling.

FIGS. 7A to 7C are exemplary picked-up images during traveling, which have been derived from the object position detection device 1 according to the first embodiment of the present invention. FIG. 7A shows an image picked up by the image pickup unit 101 at a time point t1. The acquired image indicates the state where the preceding vehicle 202 entirely fits within the image pickup view angle. FIG. 7B shows an image picked up by the image pickup unit 101 at a time point t2 subsequent to the time point t1. The acquired image indicates the state approaching the preceding vehicle 202 which does not fit within the image pickup view angle entirely while being remained in front. FIG. 7C shows a picked-up image at a time point t3 subsequent to the time point t2. The acquired image indicates the state where the preceding vehicle 202 turns to deviate from the image pickup view angle.

Figure 8:
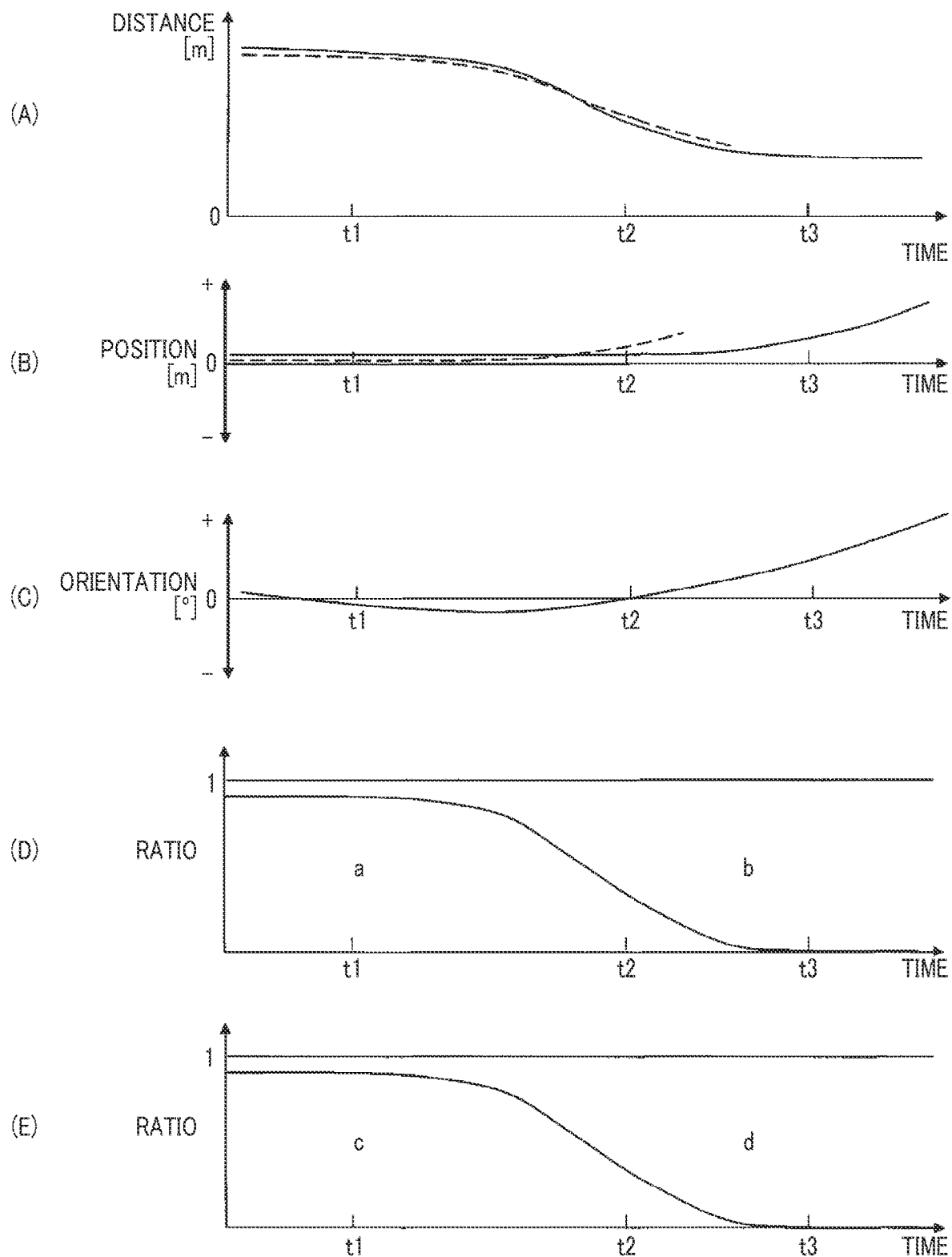
FIG. 8 shows exemplary detection results and determination results derived from the object position detection device according to the first embodiment of the present invention.

FIG. 8 represents time-series detection results from picked-up images acquired during traveling as shown in FIGS. 7A, 7B, and 7C, and the resultant ratio of the detection results eventually used for determination. Each of the time points t1, t2, t3 indicates a time at which the images are picked up as shown in FIGS. 7A to 7B, respectively.

FIG. 8A shows distance detection results. The solid line indicates the result of distance detection by the stereo distance detection unit 105, and the broken line indicates the result of distance detection by the distance detection unit 110. Referring to FIG. 8A, the x-axis denotes the time, and the y-axis denotes the distance. At the time around the time point t1, the preceding vehicle 202 entirely fits within the image pickup view angle at the far-side. The distance detection by the stereo distance detection unit 105 reduces the parallax value toward the far-side to make the influence of the error greater. If the base line length is reduced for making the device compact, accuracy of the distance detection at the far-side is lowered, which may contain the detection error. Meanwhile, distance detection by the distance detection unit 110 allows the recognition unit 108 to track using the image, and further executes the time-series processing, resulting in stabilized detection results. In the state approaching the preceding vehicle 202 at around the time point t2, the stereo distance detection unit 105 is capable of detecting the distance with high accuracy because of increased parallax. In the case of the distance detection unit 110, at the preceding vehicle 202 cannot entirely fit within the image pickup view angle, it is difficult to execute comparison with the pattern data, resulting in increased detection errors. In the state further approaching the preceding vehicle 202 at around the time point t3, the stereo distance detection unit 105 is capable of obtaining accurate detection results. Meanwhile, distance detection error that occurs in the distance detection unit 110 is further increased because of oblique tailing end surface of the vehicle. Finally, the comparison with the pattern data cannot be executed, thus failing to detect the distance.

FIG. 8B shows position detection results. The solid line indicates the result of position detection by the position detection unit 106, and the broken line indicates the result of position detection by the position detection unit 109. Referring to FIG. 8B, the x-axis denotes the time, and the y-axis denotes the position. As the position detection unit 106 detects the object position from results of the distance detection by the stereo distance detection unit 105, the result at the time point t1 contains the detection error. As time elapses to the time points t2 and t3, the position detection result becomes more accurate. Meanwhile, like the distance detection unit 110, when the preceding vehicle deviates from the image pickup view angle, the position detection unit 109 increases detection errors to make position detection undetectable in the end.

FIG. 8C shows results of detection by the orientation detection unit 111. Referring to FIG. 8C, the x-axis denotes the time, and the y-axis denotes the orientation. In this embodiment, the direction in which the preceding vehicle 202 turns to the left is designated as a positive direction. The state at the time subsequent to the time point t3 indicates that the preceding vehicle is largely turning.

FIGS. 8D and 8E indicate the ratio of distance detection results derived from one unit to those derived from the other unit, which have been eventually used by the determination unit 112, and the ratio of position detection results derived from one unit to those derived from the other unit, which have been eventually used by the determination unit 112, respectively. Referring to FIGS. 8D and 8E, the x-axis denotes the time, and the y-axis denotes the ratio.

Referring to FIG. 8D, a part a below the curve denotes the detection results derived from the distance detection unit 110 as a part of the whole, which have been used by the determination unit 112, and a part b above the curve denotes the detection results derived from the stereo distance detection unit 105 as the other part, which have been used by the determination unit 112. The total sum of parts a and b becomes 1. The determination unit 112 is configured to selectively use the detection result with higher accuracy while placing more importance (more highly weighted) thereon at each time point. At the time around the time point t1, the determination unit 112 uses the detection result derived from the distance detection unit 110 while placing more importance thereon. In the embodiment, the part a takes a value of 0.9, and the part b takes a value of 0.1 at around the time point t1. Assuming that the distance as the detection result derived from the distance detection unit 110 is z1, and the distance as the detection result derived from the stereo distance detection unit 105 is z2, the distance z to be selectively used by the determination unit 112 at around the time point t1 is expressed by the equation of $z = 0.9 \times z1 + 0.1 \times z2$.

The determination unit 112 uses more detection results derived from the stereo distance detection unit 105 at around the time point t2, and uses detection results only derived from the stereo distance detection unit 105 at around the time point t3. If the object position is located to deviate from the image pickup view angle as indicated by the position detection result, the determination unit 112 uses the detection result derived from the stereo distance detection unit 105.

Referring to FIG. 8E, a part c below the curve denotes the detection results derived from the position detection unit 109 as a part of the whole, which have been used by the determination unit 112, and a part d above the curve denotes the detection results derived from the position detection unit 106 as the other part, which have been used by the determination unit 112. At the time around the time point t1, the determination unit 112 uses the detection result derived from the position detection unit 109 while placing more importance thereon. At time around the time point t2, the determination unit 112 uses more detection results derived from the position detection unit 106. At time around the time point t3, the determination unit 112 uses detection results only derived from the position detection unit 106. If the distance detection result shows that the object is located adjacent to the position to deviate from the image pickup view angle, the determination unit 112 uses the detection results derived from the position detection unit 106.

If the detection result derived from the orientation detection unit 111 becomes larger than the angle which disables the distance detection unit 110 and the position detection unit 109 to execute detection, the determination unit 112 is allowed to use the distance detection results derived from the stereo distance detection unit 105 and the position detection result derived from the position detection unit 106.

If the distance detected by the stereo distance detection unit 105 is farther compared with a given distance, and the position detected by the position detection unit 109 is within a given range, the determination unit 112 is allowed to use the detection results derived from the distance detection unit 110 and the position detection unit 106.

If the distance detected by the stereo distance detection unit 105 is at the side closer compared with the given distance, and the position detected by the position detection unit 109 is out of the given range, the determination unit 112 is allowed to use the detection results derived from the stereo distance detection unit 105 and the position detection unit 109.

If the orientation of the object detected by the orientation detection unit 111 is larger than a given angle, the determination unit 112 is allowed to use the detection results derived from the stereo distance detection unit 105 and the position detection unit 109.

The object position detection device 1 of the embodiment allows continuous detection of the distance, position, orientation of the preceding vehicle 202 accurately even in the state where the preceding vehicle 202 deviates from the image pickup view angle. That is, the device is capable of acquiring information of the position, distance, and orientation by continuously tracking the object irrespective of the view angle position and the distance of the object.

Second Embodiment

Figure 9:
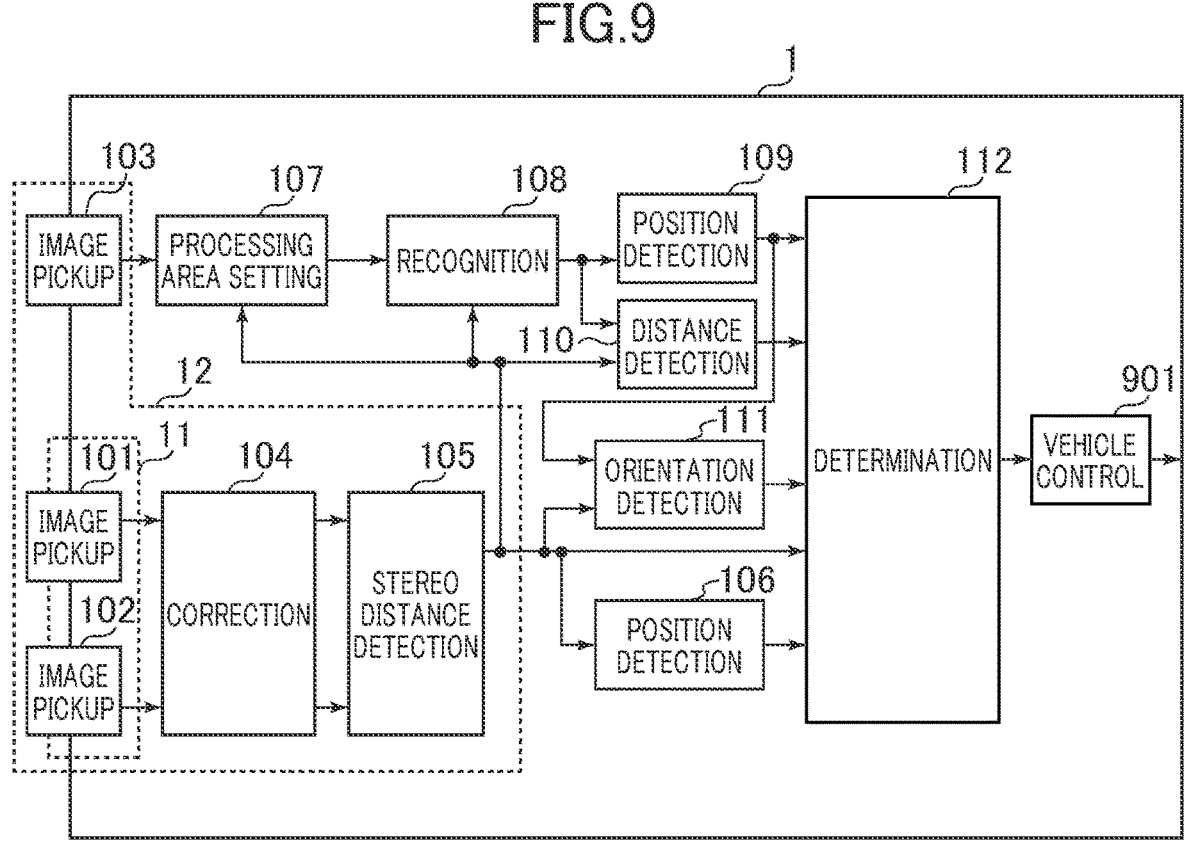
FIG. 9 shows a structure of an object position detection device according to a second embodiment of the present invention.

FIG. 9 shows a structure of an object position detection device according to a second embodiment of the present invention. In this embodiment, the device is configured to automatically follow a not shown preceding vehicle. Structures having the same functions as those shown in FIG. 1 are designated with the same codes, and detailed explanations thereof will be omitted. The object position detection device 1 is installed in the vehicle such as an automobile. A code 901 in the drawing denotes a vehicle controller. Data output from the determination unit 112 are input to the vehicle controller 901.

The vehicle provided with the object position detection device 1 (following vehicle traveling while following the preceding vehicle) follows after the preceding vehicle. The object position detection device 1 detects the distance, position, orientation of the preceding vehicle as described above.

Based on the detection results derived from the determination unit 112, the vehicle controller 901 controls other devices of the vehicle, which are not shown. A steering angle, a brake, a steering device and the like of the vehicle are targets to be controlled. Based on the detected results, the controller controls those targets so that the vehicle travels while following the preceding vehicle. The vehicle control information is output from the object position detection device 1 to other devices which are not shown via an in-vehicle network such as CAN (Controller Area Netowork). Even in the case where the following distance from the preceding vehicle is set to be too short to fit within the image pickup view angle, or the preceding vehicle turns to deviate from the image pickup view angle, the object position detection device 1 of the embodiment is capable of detecting the distance, position, orientation of the preceding vehicle accurately and continuously. It is therefore possible to follow the preceding vehicle safely.

FIG. 9 shows an example that the vehicle controller 901 is stored in the housing together with the object position detection device 1. However, the structure is not limited to the one as described above. The vehicle controller may be stored in another housing separately so that detection results are transmitted via the in-vehicle network. Alternatively, the image pickup units 101, 102 and 103 can be stored in the respective housings, individually.

Third Embodiment

Figure 10:
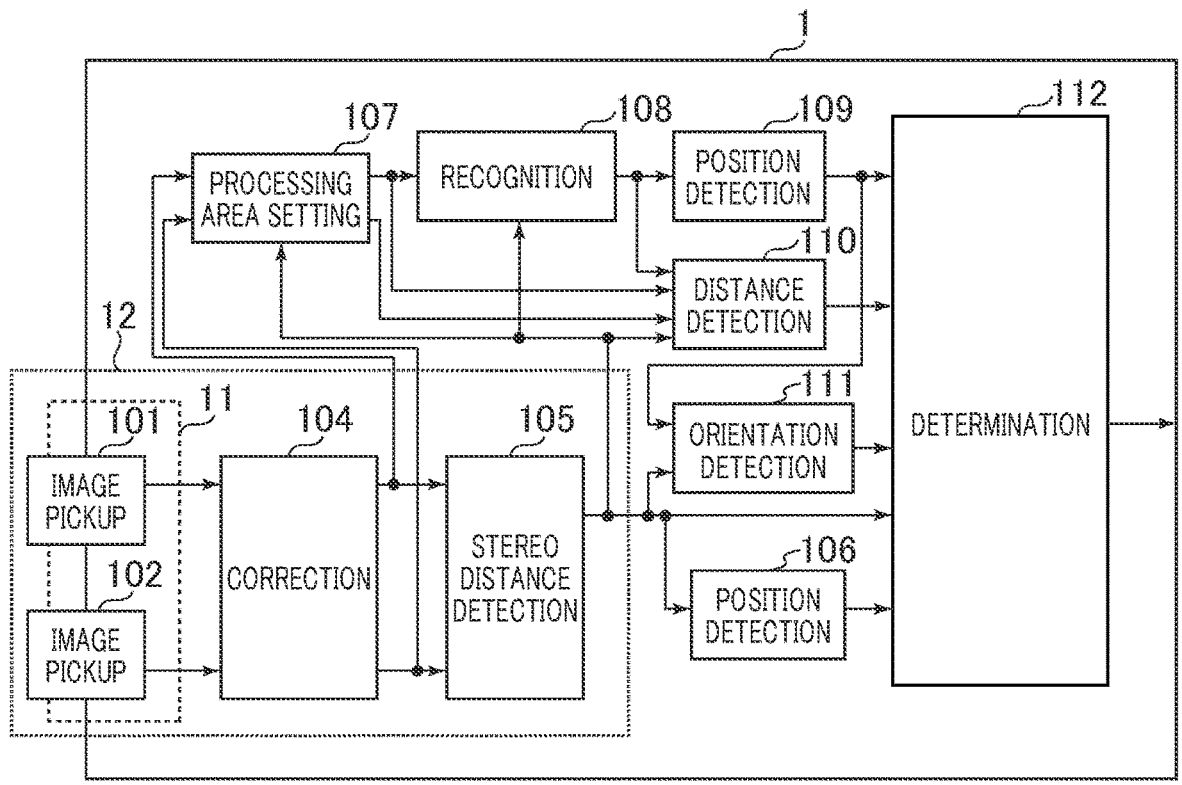
FIG. 10 shows a structure of an object position detection device according to a third embodiment of the present invention.

FIG. 10 shows a structure of an object position detection device according to a third embodiment of the present invention. Structures having the same functions as those shown in FIG. 1 are designated with the same codes, and detailed explanations thereof will be omitted. In this embodiment, the image pickup units 101 and 102 are only disposed by eliminating the image pickup unit 103 shown in FIG. 1. The image picked up by the image pickup unit 101 is input to the recognition unit 108 via the processing area setting unit 107. The distance detection unit 110 also executes distance detection through stereo processing in the same manner as the stereo distance detection unit 105. Images derived from the image pickup units 101 and 102, which have been corrected by the image correction unit 104 are input to the processing area setting unit 107. Upon reception of the detection results of the stereo distance detection unit 105, the processing area is set, and input to the distance detection unit 110. The distance detection unit 110 executes the distance detection with respect to the processing area set by the processing area setting unit 107 through the stereo processing. The processing may be implemented by the electronic circuit, or software processing. The distance detection unit 110 allows the stereo distance detection unit 105 to perform the time division operation.

In this embodiment, the two image pickup units 101 and 102 are allowed to execute the stereo distance detection and the single-eye distance detection, resulting in cost reduction of the device. In the case where one of those image pickup units is broken to fail to pick up the image, the other image pickup unit is capable of executing the distance detection and the position detection so as to maintain safety.

Fourth Embodiment

Figure 11:
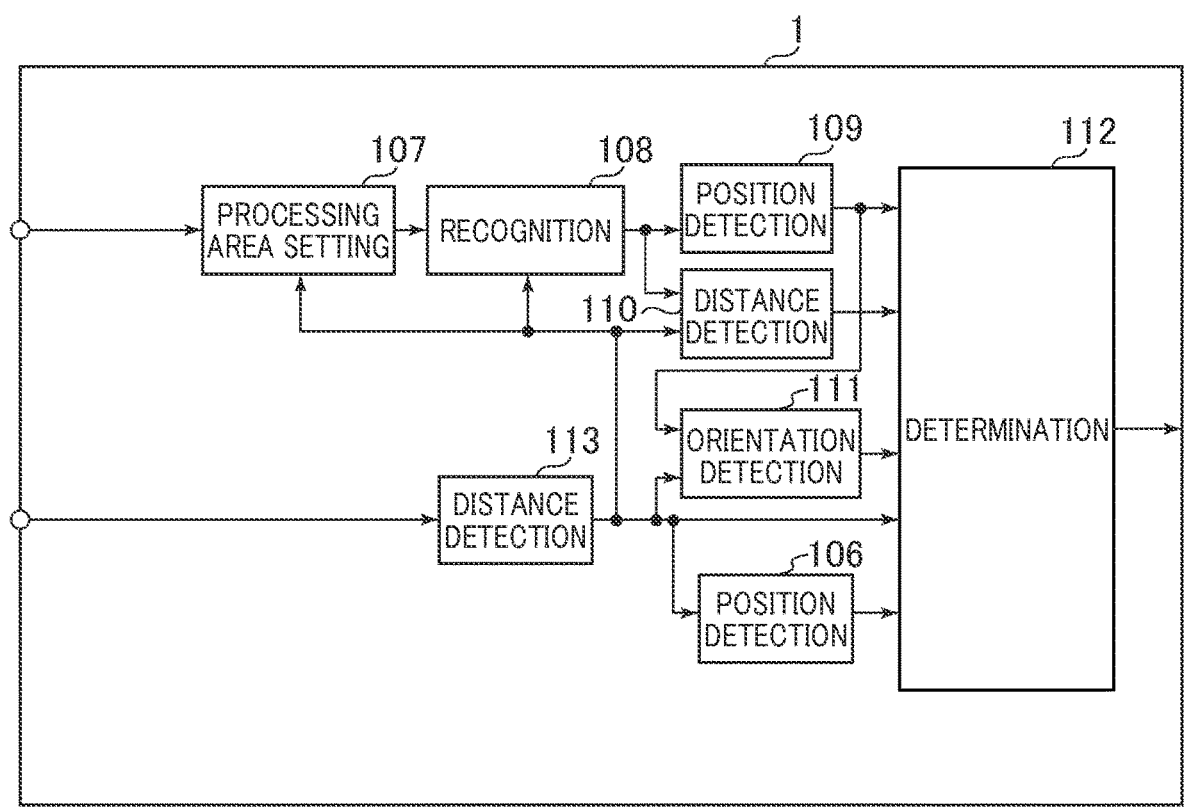
FIG. 11 shows a structure of an object position detection device according to a fourth embodiment of the present invention.

FIG. 11 shows a structure of an object position detection device according to a fourth embodiment of the present invention. Structures having the same functions as those shown in FIG. 1 are designated with the same codes, and detailed explanations thereof will be omitted. In this embodiment, the input information of the processing area setting unit 107 is derived from sensors for providing the distance and position information, which are constituted by components other than the image pickup units 101, 102, and 103. The input information is derived from a not shown radar, and the sensor such as an infrared sensor so that the distance and position of the object in the target range. In the case of using the radar, the processing area may be controlled by the processing area setting unit 107 through the method of narrowing down the beam direction of the radar to the object to be processed. Other operations are the same as those described above.

Fifth Embodiment

Figure 12:
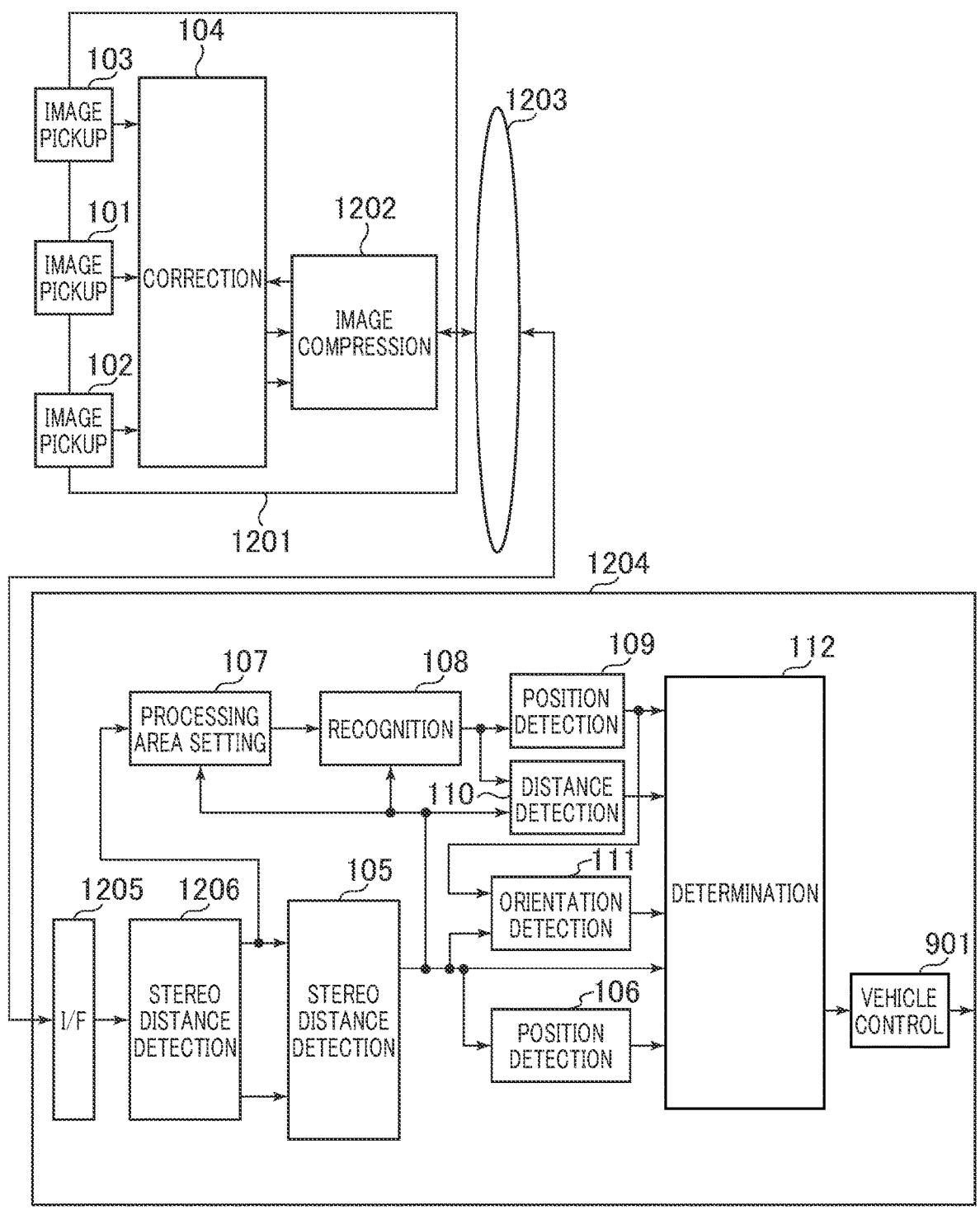
FIG. 12 shows a structure of an object position detection device according to a fifth embodiment of the present invention.

FIG. 12 shows a structure of an object position detection device according to a fifth embodiment of the present invention. Structures having the same functions as those shown in FIG. 1 are designated with the same codes, and detailed explanations thereof will be omitted. A code 1201 denotes a network image pickup section. A code 1203 denotes a LAN (Local Area Network). A code 1204 denotes a control section. The network image pickup section 1201 is installed on the vehicle windshield, for example. The control section 1204 stored in another housing separately from the network image pickup section 1201 is disposed in the place that secures the vehicle interior space. Network specified by IEEE802.3 is applicable as the LAN 1203.

The network image pickup section 1201 is connected to the control section 1204 via the LAN 1203. A code 1202 denotes an image compression/interface unit. A code 1205 denotes a network interface unit. A code 1206 denotes an image decompression unit.

Images picked up by the image pickup units 101, 102, and 103 are subjected to the luminance correction, lens distortion correction, and horizontal alignment in the image correction unit 104. The image compression/interface unit 1202 compresses the image from the image correction unit 104, and the compressed image is transmitted to the control section 1204 via the LAN 1203. The image compression is performed through the in-screen compression process for compression in the single image without using time correlation of multiple images for the purpose of reducing processing time. Alternatively, it is possible to select the compression process between the in-screen compression process and the video compression-encoding process.

The image compression/interface unit 1202 generates compression-encoding data, and transmits the generated data in accordance with a specified network protocol. The image correction unit 104 may be disposed at the stage subsequent to the image decompression unit 1206 of the control section 1204. However, compression of the image subsequent to correction of the lens distortion in the preceding stage of the image compression/interface unit 1202 of the network image pickup section 1201 is expected to provide higher image compression efficiency and higher image quality. In this case, the processing area set by the processing area setting unit 107 is transmitted to the image compression/interface unit 1202 and the image correction unit 104 from the network interface unit 1205 via the LAN 1203.

The network interface unit 1205 of the control section 1204 receives the compressed image data via the LAN 1203. In the image decompression unit 1206, the compressed image data received by the network interface unit 1205 of the control section 1204 are decompressed to the original image having the processing area set by the processing area setting unit 107 so that the distance is detected by the stereo distance detection unit 105. The subsequent processing is executed in the same manner as described above.

In this embodiment, the compressed image is transmitted via the LAN 1203 so that the processing amount at the side of the image pickup units can be reduced. Weight reduction, low power consumption, and compact housing at the side of the image pickup units allow alleviation of restriction to the dimension of the installation space in the vehicle. Sufficiently secured transmission bandwidth of the network allows transmission of the image without requiring compression/decompression.

The present invention includes various modifications without being limited to the embodiments as described above. For example, the embodiments are described in detail for readily understanding of the present invention which is not necessarily limited to the one equipped with all structures as described above. It is possible to replace a part of the structure of one embodiment with the structure of another embodiment. The one embodiment may be provided with an additional structure of another embodiment. It is further possible to add, remove, and replace the other structure to, from and with a part of the structure of the respective embodiments.

The respective structures may be implemented by hardware or the processor that executes the program. The control line and information line considered as necessary are only shown. They do not necessarily indicate all the control and information lines for the product. Actually, it may be considered that almost all the components are connected with one another.

Embodiments of the present invention may be implemented as described below.

(1)

An object position detection device is configured to detect a position of an object from images of the object picked up by multiple image pickup units. The multiple image pickup units include a first and a second image pickup units. On the assumption that the image derived from the first image pickup unit is defined as a standard image, and the image derived from the second image pickup unit is defined as a reference image, the object position detection device includes a first distance detection unit that detects a distance of the object based on a parallax obtained by searching an image element in the reference image corresponding to an image element in the standard image, a first position detection unit that detects a position of the object based on the distance detected by the first distance detection unit, a processing area setting unit that sets a processing area which contains the object detected by the first distance detection unit in any one of the images picked up by multiple image pickup units, a second position detection unit that detects a position of the object in the processing area, a second distance detection unit that detects a distance of the object based on the position of the object detected by the second position detection unit, an orientation detection unit that detects an orientation of the object based on the position of the object detected by the second position detection unit, and a determination unit that determines the distance and the position of the object in accordance with the distance, the position, and the orientation, which have been detected by the first distance detection unit, the second distance detection unit, the first position detection unit, the second position detection unit, and the orientation detection unit, respectively.

(2)

In the object position detection device according to the one in the foregoing description (1), the second position detection unit detects a predetermined part of the object being tracked, and the orientation detection unit detects an orientation of a position of a rear end surface of the object specified from the predetermined part detected by the second position detection unit.

LIST OF REFERENCE SIGNS 1 object position detection device,
101 to 103 image pickup unit
104 image correction unit,
105 stereo distance detection unit
106 position detection unit
107 processing area setting unit,
108 recognition unit,
109 position detection unit, 110 distance detection unit,
111 orientation detection unit,
112 determination unit,
201 common image pickup area,
202 to 205 object,
301 to 305 processing area,
401 processing area,
901 vehicle controller,
1201 network image pickup section,
1202 image compression/interface unit,
1203 LAN
1204 control section,
1205 network interface unit,
1206 image decompression unit

The invention claimed is:

1. An object position detection device, comprising:
a first distance detection unit that detects a distance of an object from images derived from a first image pickup unit and a second image pickup unit;
a first position detection unit that detects a position of the object based on the distance detected by the first distance detection unit;
a processing area setting unit that sets a processing area which contains the object detected by the first distance detection unit in any one of the images picked up by multiple image pickup units including the first and the second image pickup units;
a second position detection unit that detects a position of the object in the processing area;
a second distance detection unit that detects a distance of the object based on the position of the object detected by the second position detection unit;
an orientation detection unit that detects an orientation of the object based on the position of the object detected by the second position detection unit; and
a determination unit that determines the distance and the position of the object in accordance with information of detections executed by the first distance detection unit, the second distance detection unit, the first position detection unit, the second position detection unit, and the orientation detection unit, respectively.

2. The object position detection device according to claim 1, wherein:
the second position detection unit detects a predetermined part of the object being tracked; and
the orientation detection unit detects an orientation of a position of a tail end surface of the object specified from the predetermined part detected by the second position detection unit.

3. The object position detection device according to claim 1, wherein when the distance detected by the first distance detection unit is at a side farther than a predetermined distance, and the position detected by the first position detection unit is within a predetermined range, the determination unit uses detection results derived from the second distance detection unit and the second position detection unit.

4. The object position detection device according to claim 1, wherein when the distance detected by the first distance detection unit is at a side closer than a predetermined distance, and the position detected by the first position detection unit is out of a predetermined range, the determination unit uses detection results derived from the first distance detection unit and the first position detection unit.

5. The object position detection device according to claim 1, wherein when the orientation of the object detected by the orientation detection unit is larger than a predetermined angle, the determination unit uses detection results derived from the first distance detection unit and the first position detection unit.

6. A travel control system that controls traveling of a following vehicle that follows a preceding vehicle, wherein:
the following vehicle includes a position detection device that detects a position of the preceding vehicle from images of the preceding vehicle, which are picked up by multiple image pickup units each for picking up a forward image;
the multiple image pickup units include a first image pickup unit and a second image pickup unit; and
the position detection device includes a first distance detection unit for detecting a distance of the preceding vehicle based on a parallax obtained by searching an image element in a reference image defined to be derived from the second image pickup unit, the image element corresponding to an image element in a standard image defined to be derived from the first image pickup unit, a first position detection unit that detects a position of the preceding vehicle based on the distance detected by the first distance detection unit, a processing area setting unit that sets a processing area which contains the preceding vehicle detected by the first distance detection unit in any one of images derived from the multiple image pickup units, a second position detection unit that detects a position of the preceding vehicle in the processing area, a second distance detection unit that detects a distance of the preceding vehicle based on the position of the preceding vehicle detected by the second position detection unit, an orientation detection unit that detects an orientation of the preceding vehicle based on the position of the preceding vehicle detected by the second position detection unit, a determination unit that determines the distance and the position of the preceding vehicle in accordance with the distance, the position, and the orientation, which have been detected by the first distance detection unit, the second distance detection unit, the first position detection unit, the second position detection unit, and the orientation detection unit, respectively, and a vehicle controller that controls the following vehicle based on a determination made by the determination unit.

7. A travel control method for controlling traveling of a following vehicle that follows a preceding vehicle, the method comprising:
a step of detecting a first distance of the preceding vehicle based on a parallax obtained by searching an image element in a reference image defined to be derived from a second image pickup unit, the image element corresponding to an image element in a standard image defined to be derived from a first image pickup unit, the first image pickup unit and the second image pickup unit forming multiple image pickup units each for picking up a forward image of the following vehicle;
a step of detecting a first position of the preceding vehicle based on the first distance detected by the step of detecting the first distance;
a step of setting a processing area that contains the preceding vehicle detected by the step of detecting the first distance in any one of images derived from the multiple image pickup units;
a step of detecting a second position of the preceding vehicle in the processing area;
a step of detecting a second distance of the preceding vehicle based on the second position;

a step of detecting an orientation of the preceding vehicle based on the second position;
a step of determining a distance and a position of the preceding vehicle in accordance with the first distance, the second distance, the first position, the second position, and the orientation; and
a step of controlling the following vehicle based on a determination made by the determination step.

* * * * *